Patented Oct. 24, 1933

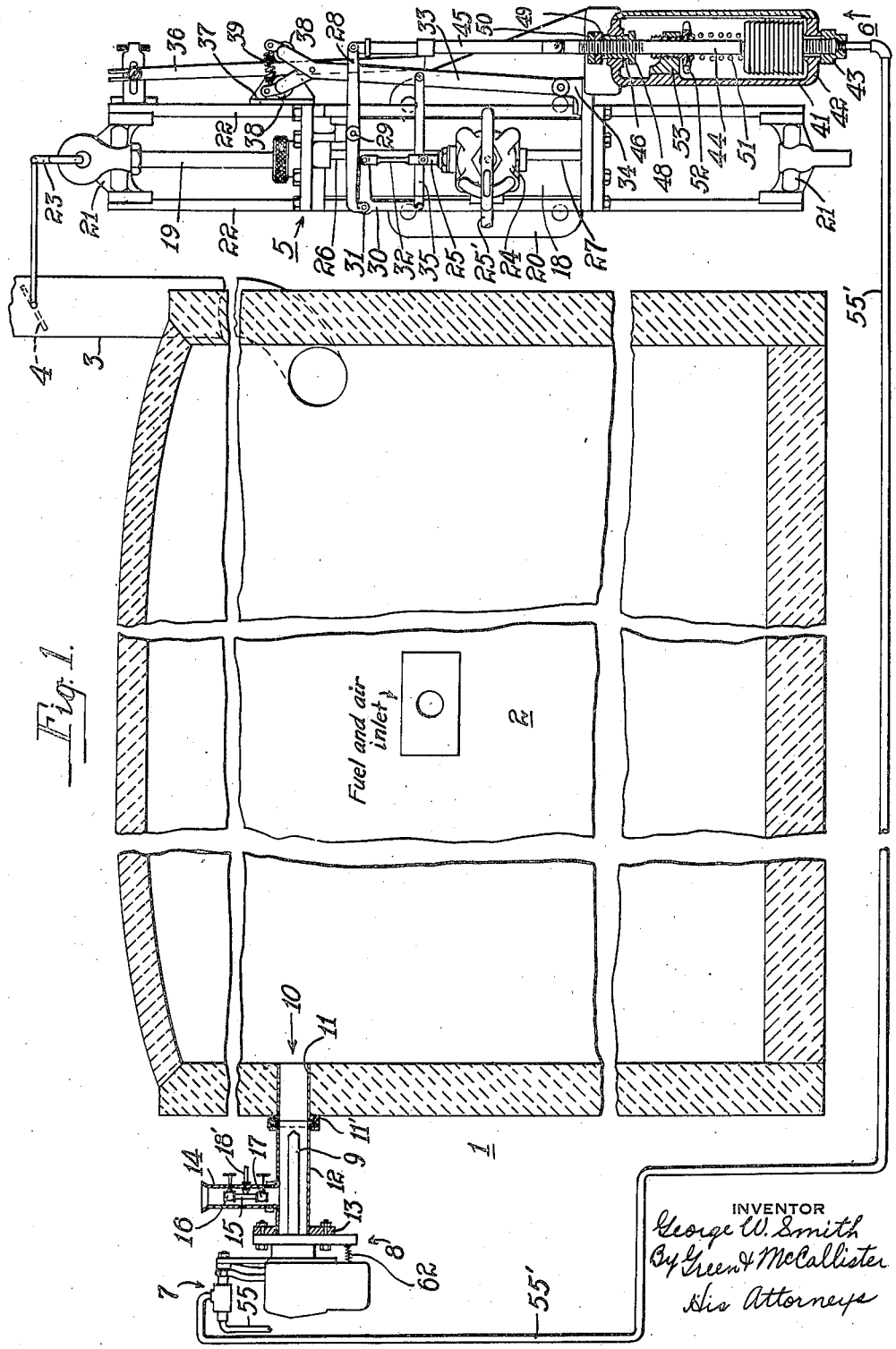

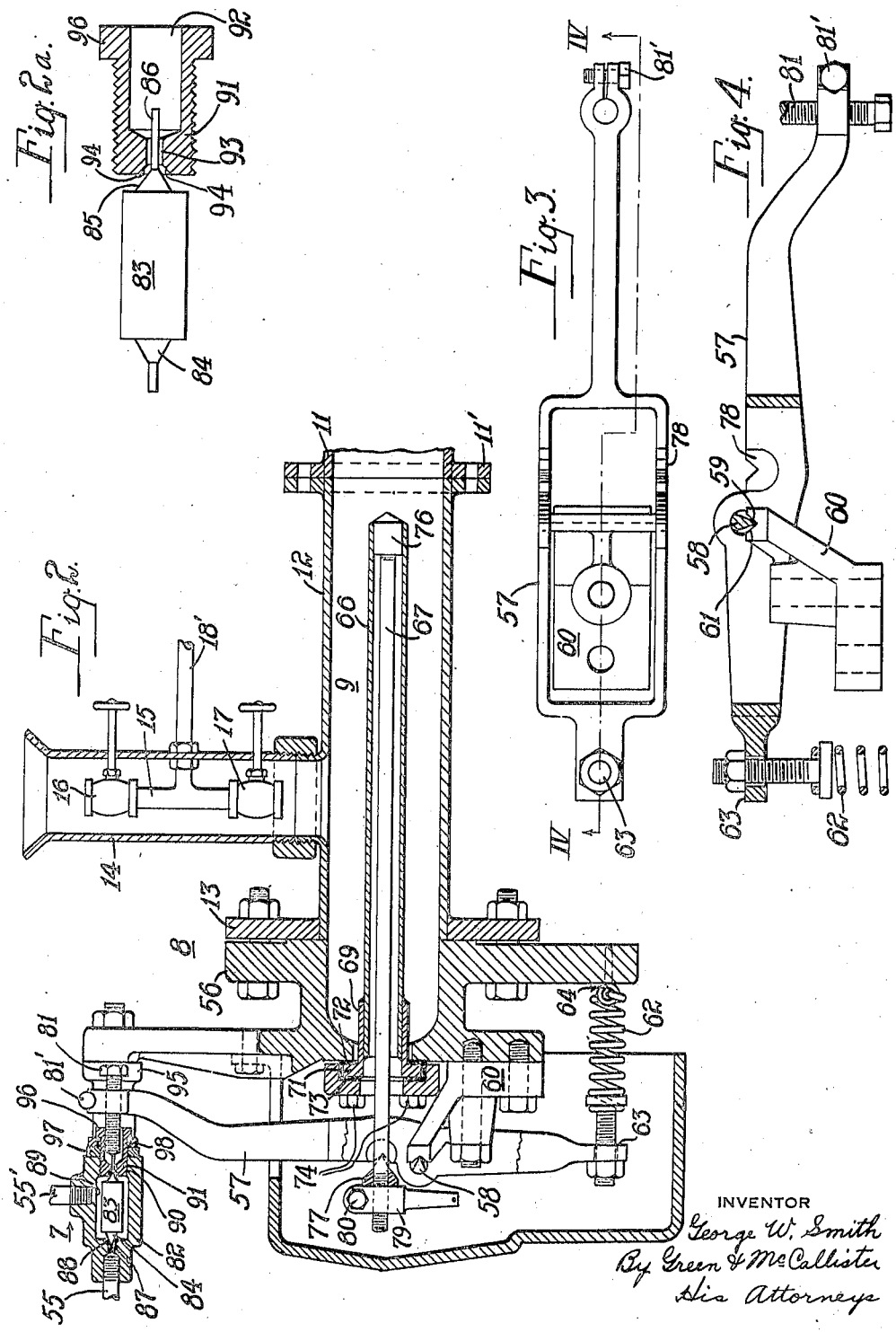

1,931,906

UNITED STATES PATENT OFFICE 1,931,906

FURNACE PRESSURE CONTROL

George W. Smith, Pittsburgh, Pa., assignor to John M. Hopwood, Dormont, Pa.

Application March 7, 1931. Serial No. 520,949

17 Claims. (Cl. 236—15)

This invention relates, in general, to furnaces and more particularly to a method of and means for controlling pressures within combustion or heating chambers thereof.

In the operation of furnaces, either metallurgical or boiler furnaces, certain variables, such as the pressure in the furnace, the air supplied for combustion, the pressure of the exhaust gases drawn from the furnaces, the load demand, and the supply of fuel, must be taken account of and means provided for their proper regulation in order to obtain flexible and efficient operation thereof.

The invention as disclosed may be adapted to control one, some, or all of these variables. In order that the invention may be illustrated in a simple manner, the application thereof to the control of only one of the above named variables will be shown and described. In this case the variable chosen is the furnace pressure which is sought to be maintained constant at some predetermined value; and the means for regulating the furnace pressure is an outlet damper which, when adjusted, affects the furnace draft and consequently the furnace pressure.

To provide for the adjustment of the damper, a zone or region is established and heated, and the temperature of the zone is varied in accordance with variations in one, some, or all of the variables entering into the operation of a furnace. In this case, the temperature of the zone or region is arranged to vary in accordance with variations in the furnace pressure, temperature responsive means or devices being employed to affect the damper adjustments in accordance with the variations in temperature of the zone or region. The damper adjustments affect the furnace draft and, therefore, the furnace pressure.

Generally stated, an object of this invention is to provide for the maintenance and control of any predetermined condition of pressure within the heating or combustion chamber of furnaces or heating devices.

Another object of the invention is to provide for the control of the pressure within the combustion or heating chambers of furnaces in accordance with the ingress and egress of air and furnace gases.

And a further object of the invention is to provide for the control of the pressure within the combustion, or heating chambers of furnaces in accordance with the temperature existing at a preselected point as affected by the flow of air into the furnace or by the flow of gases from the furnace.

Other objects of the invention will, in part, be apparent and will, in part, be obvious from the following description taken in conjunction with the accompanying drawings in which:

Figure 1 is a diagrammatic illustration of a furnace or heating device and a control system for controlling the pressure within the combustion or heating chamber thereof:

Fig. 2 is a view in longitudinal section of an assembled temperature responsive device embodied in the control system schematically illustrated in Fig. 1;

Fig. 2a is a view in section of a valve detail;

Fig. 3 is a fragmentary top plan view of a detail embodied in the device shown in Fig. 2; and Fig. 4 is a view in section taken on line IV—IV of the detail shown in Fig. 3.

In order to illustrate the manner in which the invention may be practiced, a furnace 1 is shown. It is to be understood that the particular furnace shown is merely illustrative of furnaces in general, and that the invention may be utilized to control the pressure within the combustion or heating chambers thereof. In this particular case, chamber 2 of the furnace may be considered either as a heating or a combustion chamber.

In the operation of furnaces, such as furnace 1, for example, it is desirable to maintain a predetermined pressure within the heating or combustion chambers thereof. The particular pressure to be maintained in any particular furnace, depends upon the operating temperatures thereof, the type of work to be performed, the character and quality of the refractory walls, and other factors, such as the comparative value of work done and the cost of repairing and maintaining the refractory walls of the furnaces and other parts thereof affected by the pressure and temperature of hot gases.

Ordinarily, it is desirable to so operate furnaces or heating devices that the pressure within the heating or combustion chambers, chamber 2, for example, is equal to atmospheric pressure. When the pressure in the furnace chamber is sub-atmospheric, infiltration of air is occasioned through the pores and cracks in the refractory walls, through the joints between the refractory bricks, cracks in the furnace setting and around the doors and other openings into the furnace. Such infiltration of air, which is usually at a decidedly lower temperature than the temperature within the furnace, may not only reduce the temperature of the furnace and adversely affect its operation, but may so change the type and character of the atmosphere in the furnace chamber that the quality of the work done or produced by the furnace will be deleteriously affected.

If a pressure higher than atmospheric is maintained within the furnace or heating device, such an increase in furnace temperature may result that the refractory brick work of the walls and roof may be seriously damaged, and the life thereof materially reduced. In many types of furnace construction, if the furnace pressure is higher than atmospheric, a loss of flame and hot gases through crevices in the furnace setting, around the doors, and cracks and openings in the furnace walls and roof, may result.

Since the furnace pressures referred to above are ordinarily controlled through the regulation of the furnace draft, the system embodying the invention is primarily arranged to operate upon the furnace draft mechanism to regulate and control the furnace pressure.

The control system is arranged to so adjust the damper mechanism that a balanced atmospheric condition may be maintained in the furnace, this condition of pressure being desired in most furnace applications. However, the control system is capable of such manipulation and adjustment that either sub-atmospheric or super-atmospheric pressures may be established and maintained substantially constant at any predetermined value.

Referring now to Fig. 1 of the drawings, furnace 1 may, for purposes of illustration, be considered an open hearth furnace having a stack 3 through which gases of combustion from the furnace chamber 2, may escape. Stack 3 is provided with the usual damper 4 to regulate the draft. By properly manipulating and adjusting the damper, the pressure in chamber 2 may be maintained substantially constant at any pre-selected value.

The damper 4 may be operated by a suitable form of operating mechanism. For this purpose a regulator 5 is provided, a pressure responsive element 6 being utilized to control the operation of the regulator.

Pressure responsive element 6 may be connected to a source of fluid pressure, operation of element 6 being affected by admitting fluid under pressure thereto and exhausting said fluid therefrom in accordance with variations or changes in pressure within the furnace. In response to such admitting and exhausting of fluid under pressure to and from the pressure responsive element 6, regulator 5 is caused to so operate or adjust the damper that a predetermined, substantially constant, pressure may be maintained in the furnace chamber.

To control the admission of fluid under pressure to and from the pressure responsive element 6, in accordance with changes or variations in furnace pressure, a valve 7 and a temperature responsive device 8 are provided. The temperature responsive device is arranged to operate valve 7 in such a manner that, as the ambient temperature about thermal element 9 changes or varies, valve 7 will be operated in accordance with such changes or variations. If valve 7 is opened, pressure responsive element 6 responds, and causes regulator 5 to adjust the damper to such a position that the proper or desired pressure in furnace chamber 2 is attained.

In order that a condition may be established to which the temperature responsive device will respond, and affect the proper adjustment of damper 4, an opening 10 is provided in a wall of the furnace. It will, of course, be understood that the opening is located in such a position that the temperature responsive device will be most effective in obtaining the most efficient adjustments of the damper. Therefore, the type of furnace construction will largely determine the location of opening 10.

A tube or cylinder 11 is placed in opening 10. The outer end of this tube or cylinder has a flange 11' lying flush with the outside surface of the furnace wall. To flange 11' is secured a housing 12 in which the thermal element of the temperature responsive device 8 is disposed. Housing 12 has a flange 13 at its outer end to which the temperature responsive device 8 is secured.

In order that communication between the atmosphere and the interior of the furnace chamber 2 may be established through housing 12 and tube or cylinder 11, a tube or cylinder 14 is attached to the housing. The tube or cylinder 14 is open at both ends and communicates with the interior of the housing. The outer end of tube or cylinder 14 may be flared or of bell shape to facilitate the flow of air or gases through the housings 12 and pipe 11 to or from the furnace chamber.

When the pressure in furnace chamber 2 is equal to atmospheric, it will be apparent that neither air nor gas will flow through tube 14, housing 12 and tube 11 in opening 10. However, if the pressure in the furnace chamber is above atmospheric, hot gases will flow from the furnace chamber and be discharged at the outer end of tube 14. If the pressure in furnace chamber 2 is sub-atmospheric, air will flow into the furnace chamber.

When the furnace pressure is above atmospheric, it is reduced by opening the damper to the proper position. Such opening of the damper takes place because the flow of hot gases from the furnace chamber increases the temperature of the thermal element of temperature responsive device 8, whereby valve 7 is operated to admit pressure to the pressure responsive device 6. Regulator 5 therefore operates to open the damper to such a position that the pressure in furnace chamber 2 is reduced. If the furnace pressure upon being reduced is equal to atmospheric pressure, neither air or gas will flow past the thermal element of device 8, therefore, damper 4 will remain in its adjusted position until a change in pressure takes place in the furnace chamber.

If the pressure in the furnace chamber 2 is sub-atmospheric, air will flow through housing 12 and tube 14 into the furnace whereby the temperature of the thermal element 9 of device 8 is reduced causing valve 7 to close. Upon the closure of valve 7, the pressure in pressure responsive device 6 is reduced, whereby regulator 5 operates to shift damper 4 towards the closed position until the pressure in furnace chamber 2 is restored to atmospheric.

In some types of furnaces it may be necessary to maintain either sub-atmospheric pressure or super-atmospheric pressure in the furnace chamber. Which ever pressure is required may be obtained by forcing air at a predetermined super-atmospheric pressure into the furnace chamber through housing 12 and tube 11, in case super-atmospheric pressure is desired, or by forcing air in the opposite direction so as to produce an aspirating effect tending to draw hot gases out of the furnace chamber and discharging it through tube 14 in case sub-atmospheric pressure is required. In either case, the thermal element of device 7 is so affected that proper adjustment of damper 4 is obtained to maintain the pressure in furnace chamber 2 constant at the value desired.

In order that either super-atmospheric or sub-atmospheric pressure may be obtained, a T-pipe fitting 15 is disposed in tube or cylinder 14. A valve 16 is located in one leg of this fitting and a valve 17 in the other. Pipe fitting 15 may be connected to an air line 18' to which air is supplied preferably at a constant pressure.

If furnace 1 is to be operated at super-atmospheric pressure, valve 16 is closed and valve 17 adjusted until the proper amount of air is flowing through housing 12 and tube 11 into the furnace. By proper adjustment of the thermostatic device 8 and valve 17, such control of damper 4 may be obtained that any predetermined super-atmospheric pressure may be maintained in the furnace chamber.

In case the furnace is to be operated at sub-atmospheric pressure, valve 17 is closed and valve 16 opened, whereby a flow of air is directed outwardly through tube 14. Such flow of air produces an aspirating effect causing air to flow from the furnace chamber 2 over the thermal element of device 8. Damper 4 will then be adjusted until the desired sub-atmospheric pressure condition is established in the furnace chamber.

If it is desired to operate the furnace at atmospheric pressure, valves 16 and 17 may be closed or the pipe 14 and the valves may be omitted.

From the above it will be apparent that furnace 1 may be operated either at atmospheric, sub-atmospheric or super-atmospheric pressure. The control of the furnace pressure is accomplished by establishing a condition of temperature which is affected by changes in furnace pressure, subjecting a temperature responsive element to said condition of temperature, and controlling instrumentalities, having a direct bearing upon the furnace pressure, in accordance with variations and changes in said condition of temperature.

The instrumentalities or devices, for example, regulator 5, pressure responsive element 6, valve 7 and temperature responsive device 8, utilized to carry into effect the furnace pressure control, will now be described in detail in the order set forth above.

Regulator 5

Regulator 5 may be of any construction suitable for the efficient adjustment of damper 4. A preferred type of regulator is the one illustrated since its usefulness and adaptability to damper control has been established.

As illustrated, regulator 5 comprises a cylinder 18 having a piston therein (not shown) with a piston rod 19 attached thereto. Cylinder 18 may be secured to a bracket 20 suitable for mounting the regulator on framework at the place of application.

Piston rod 19 carries a cross-head 21 from which side rods 22 depend. The lower ends of the side rods may extend below the lower end of the cylinder and be connected by a cross-head 21. As the piston rod is moved up or down with the piston in cylinder 18, the cross-heads move up or down. Such movements may be utilized to operate or adjust the damper by connecting the upper cross-head to the damper through a link 23. The lower cross-head may also be connected to devices to be operated by the regulator when necessary.

The piston in cylinder 18 may be moved in response to the admission of fluid under pressure to the cylinder. If the pressure enters the cylinder at the underside of the piston, the piston will move upwardly; or if admitted to the cylinder at the upper side thereof, the piston will move downwardly.

In order that fluid under pressure may be admitted to cylinder 18 at one side or the other of the piston, a valve 24 is mounted on the cylinder. Valve 24 has a valve stem 25 which, when moved upwardly, operates the valve to admit pressure to the cylinder at the top side of the piston. When the valve is in this position, pressure enters the valve through a port 25', flows through the valve, along a passageway 26 and is discharged into the upper end of the cylinder. The piston will, therefore, move downwardly carrying with it the cross-heads and the side rods attached thereto.

If valve stem 25 is moved downwardly, the movement of the piston, as described above, is reversed. In this case, pressure flows through the valve along a passageway 27 and is discharged into the lower end of the cylinder causing the piston, the cross-heads and side rods carried thereby to move upwardly.

In order that the piston may be caused to move in incremental steps in either direction, a system of levers is provided. This system is so arranged that the valve is closed when the piston has traveled a predetermined distance. The lever system is adjustable also, so that the length of travel required of the piston to close the valve, may be varied.

The system of levers referred to above comprises a rocker bar 28 pivotally mounted on the frame at 29, a bell crank 30 pivotally mounted at 31 on bar 28, and a link 32 pivotally connected at one end to the horizontal arm of the bell crank and at the other end to the valve stem. The lever system also includes a lever 33 pivotally mounted at its lower end in a bracket 34 secured to the lower end of cylinder 18, a link 35 pivotally connected to the depending leg of the bell crank 30 and the lever 33, and an angling bar 36 mounted on a bracket 37 carried by one of the side rods 22.

The upper end of lever 33 carries rollers 38 between which angling bar 36 is disposed, the rollers being yieldingly pressed against the angling bar by a spring 39.

If rocker bar 28 is turned on its pivot in one direction or the other, bell crank 30 and link 31 will be moved whereby the valve is operated to admit pressure to one side or the other of the piston. When the piston has moved a predetermined distance, the angling bar 36, being carried by one of the side rods, will move with it. As the angling bar moves, lever 33 is swung either to the right or the left, depending upon the direction of movement of the piston, carrying with it link 35. As link 35 moves, bell crank 30 turns about its pivotal connection to rocker bar 28 and closes the valve.

For example, if rocker bar 28 is turned in a clockwise direction, bell crank 30, link 31 and valve stem 25 will move upwardly opening the valve whereby pressure is admitted to the upper side of the piston, as aforesaid. The piston, piston rod, side rods and angling bar 36 will then move downwardly. As the angling bar moves downwardly lever 33 turns in a counterclockwise direction, moving link 35 to the left and turning bell crank 30 in a clockwise direction, whereby valve stem 25 is moved downwardly to close the valve and shut off the pressure to the cylinder. The valve is closed in this manner when the piston has traveled a predetermined distance.

It will be apparent from the drawings that if angling bar 36 is inclined more towards the horizontal and less to the vertical, only a short travel of the piston is required to close the valve, whereas a longer travel is required if the angling bar is inclined more to the vertical and less to the horizontal.

If rocker bar 28 is turned in a counter-clockwise direction, valve stem 25 is moved downwardly, opening the valve whereby pressure is admitted to the under-side of the piston. Piston rod 19, cross head 21, side rods 22, and angling bar 36 will then move upwardly. Upward movement of the angling bar causes the lever 33 to swing in a clockwise direction, moving link 35 to the right and turning bell crank 30 in a counter-clockwise direction. Such turning of the bell crank moves the valve stem upwardly whereby the valve is closed and the pressure to the cylinder shut off. The valve is closed when the piston has traveled a predetermined distance.

From the aforesaid, it will be apparent that cross-heads 22 move in incremental steps in either direction, in response to successive openings and closings of the valve. Such movements of the regulator cross-heads are utilized to adjust the position of the damper resulting in adjustments in the furnace draft and furnace pressure.

*Pressure responsive element 6*

Pressure responsive element 6 is employed to turn rocker bar 28 on its pivot whereby the valve is operated to initiate the movements of the regulator cross-heads required to obtain the necessary adjustments of damper 4. Element 6, as aforesaid, is operated in accordance with deviations in furnace pressure from the value sought to be maintained constant.

The particular form of pressure responsive element chosen for purposes of illustration comprises a bellows 41 mounted in a housing 42. The lower end of the bellows has a pipe fitting attached thereto that extends through the housing. A nut 43 having screw thread engagement with the pipe fitting serves to anchor the lower end of the bellows to the housing.

A rod 44 is attached to the upper end of bellows 41 and extends upwardly through the housing and is connected by a connecting rod 45 to the right hand end of rocker bar 28. In order to limit the travel of the bellows in either direction, as it expands or contracts, a sleeve 46 is mounted on rod 44 and has screw thread engagement therewith so that its position on the rod may be adjusted to obtain the proper travel of the bellows. Sleeve 46 extends through the top of the housing and has a flange 48 at its lower end. This flange when moved against the top of the housing limits the upward travel of the bellows. A washer 49, larger than the opening in the housing through which the sleeve 46 moves, is secured at the upper end of the sleeve by a nut 50. Washer 49, when moved against the top of housing 42, limits the downward travel of the bellows.

In order that the expansion and contraction of bellows 41 may be a direct function of the pressure applied to the interior thereof, a compression spring 51 is provided. Spring 51 is disposed about rod 44 and between the top of the bellows 41 and an adjustable nut 52 that has screw thread engagement with a bracket 53 secured to the housing. By turning the nut 52 into or out of bracket 53, spring 51 may be compressed to produce the initial loading desired on bellows 41. This loading will be determined by the pressure to be applied to the bellows and the travel thereof for any particular pressure. Since bellows 41 is spring loaded, device 6 may be regarded as a weighing device because the deflection that the bellows produces in spring 51 will be substantially in direct proportion to the force required to affect a predetermined change in the axial length thereof.

The pressure required for operating bellows 41 may be supplied from a pressure line 55, having therein fluid under pressure, for example, compressed air. The air line is connected to valve 7 which in turn is connected to a line 55'. Line 55' communicates with the interior of bellows 41 through nut 43, the nut being tapped to permit the coupling of the line thereto. The pressure applied to bellows 41 is under the control of valve 7 located between lines 55 and 55', the valve being operated by the temperature responsive device 8 in accordance with changes in the ambient temperature about thermal element 9 thereof as affected by changes or variations in the furnace pressure.

If the pressure in the furnace falls below the value to be maintained therein, the temperature of thermal element 9 falls, causing the valve 7 to either close or partially close so as to reduce the pressure in bellows 41. Rocker bar 28 is therefore turned in a clockwise direction, and valve 24 is opened to admit pressure to the top side of the piston in cylinder 18, whereby cross-head 22 is moved downwardly a predetermined distance as fixed by the angling bar 36, whereby the damper is adjusted towards its closed position to increase the pressure in the furnace.

If the furnace pressure is not restored valve 7 will be operated again to repeat the aforementioned operation of bellows 41 and regulator 5 until the damper has been closed sufficiently to increase the furnace pressure to the desired value.

When the furnace pressure is above the desired value, hot gases will flow from the furnace into and through housing 12 to increase the ambient temperature of thermal element 9, whereby the aforementioned operation of valve 7 is reversed. In this case, the valve is operated to increase the pressure in bellows 41. When the pressure in bellows 41 is increased it expands and turns rocker bar 28 in a counter-clockwise direction. Valve 24 is therefore opened to admit pressure at the lower end of cylinder 14, whereby cross-head 22 is moved upwardly a predetermined distance as fixed by angling bar 36, to open damper 4 a predetermined amount. If the pressure in the furnace is not reduced to the desired value, the pressure in bellows 41 is again reduced to affect a further opening of the damper. The above operation will continue until the damper has been opened to that position which will establish the desired pressure in the furnace.

*Temperature responsive device 8*

Temperature responsive device 8 comprises a base 56, thermal element 9, and a beam 57 mounted on a cross-pin 58 having a knife edge 59, and a fulcrum 60 secured to the base. The fulcrum has a V-shaped seat 61 to accommodate the knife edge 59.

Movements of the beam 57 in one direction, when thermal element 9 expands or elongates, are yieldingly opposed by a tension spring 62.

The spring may be adjustably secured at 63 to the beam and at 64 to the base 56. In practice, the spring is so adjusted that the beam will follow the movements of element 9 as it expands or contracts.

Thermal element 9 comprises a tube 66 having a relatively high thermal coefficient of expansion, and a rod 67, having a relatively low thermal coefficient, disposed within the tube.

One end of tube 66 is secured to a bushing 69, as by brazing. The bushing has a flange 71 between which and the base packing 72 is placed. A cap 73 is disposed over the flange of bushing 69 with packing interposed. The cap and bushing may be firmly secured to the base by screws 74, and when so secured, the packing seals the opening in the base through which the bushing 69 and rod 67 extend, thereby preventing the flow of air or gas from the interior of housing 12 through the base 56.

The free end of tube 66 is closed by a plug 76 brazed or otherwise suitably secured thereto; the plug being tapped to accommodate one end of rod 67. Free end of rod 67 carries a knife edge 77 that seats in seats 78 secured to the beam 57. An adjustment member 79 holds the knife edge in place; a lock screw 80 being provided to lock member 79 after it has been adjusted.

One end of beam 57 carries a screw 81 that operates the valve 7 as the beam is rocked on fulcrum 60 by changes in length of the tube 66 caused by changes in temperature thereof. Screw 81 is adjustable with respect to the beam and may be locked or clamped in any adjusted position by a locking screw 81'.

Valve 7 comprises a valve body 82 having a valve 83 therein. Valve 83 is provided with conical end portions 84 and 85, portion 85 having an extension 86 disposed to engage the end of screw 80 carried by beam 57.

Valve body 82 has an inlet port 87 connected to pipe line 55. Port 87 terminates in a valve seat 88 in which conical portion 84 may seat to shut off communication between lines 55 and 55', and thereby to shut off the pressure applied to bellows 41. Portion 84 has an extension disposed in port 87 to guide the upper end of the valve.

Line 55' is connected to an outlet port 89 in the valve body. When valve seat 88 is uncovered air flows from line 55 through the valve body and port 89 to line 55' and thence to the interior of bellows 41.

One end of valve body 82 has a screw-threaded opening 90 which is large enough to permit the insertion and removal of valve 83. A bushing 91 is screwed into opening 90. Bushing 91 has a bore 92 large enough to permit free movement therein of screw 81 carried by beam 57. Bore 92 terminates in an exhaust port 93 of materially smaller diameter than the bore. A valve seat 94 is formed at the end of the exhaust port in which conical portion 85 seats and through which extension 86 of the valve passes.

When inlet port 87 is closed by valve 83 and exhaust port 93 is uncovered, air flows from bellows 41 through line 55', outlet port 89 and exhaust port 93 to bore 92 from which it exhausts to the atmosphere. The pressure in bellows 41 is thereby reduced, causing it to collapse.

As will be observed in Fig. 2, valve 83 is so constructed that the inlet ports may both be partially open at the same time. In this case, part of the air from line 55 will exhaust through the exhaust port and part will be transmitted to bellows 41, but at a reduced pressure. The valve is therefore capable of completely shutting off the air supply to the bellows, of admitting full pressure thereto when the exhaust port is completely closed, or of admitting a series of reduced or intermediate pressures to the bellows. As the temperature of thermal element 9 varies, beam 57 will be rocked to operate the valve in this manner so that air at a varying pressure may be supplied to bellows 41.

In order to mount the valve on base 56, a yoke 95 is provided and secured thereto. The valve is held in place by a flange 96 of bushing 91 and a lock nut 97, the flange and the lock nut being disposed on opposite sides of a web 98 of the yoke.

To adjust the temperature responsive device to establish the pressure desired in the furnace, knife edge 77 is released by turning adjustment member 79 towards the free end of rod 67. The thermal element is then allowed to come to a temperature corresponding to the pressure desired in the furnace. Adjustment member 79 may now be turned until knife edge 77 is in place in seats 78, in which position it is locked by screw 80. Screw 81 is adjusted next until the pressure in line 55' is of that value which will cause bellows 41 acting through regulator 5 to adjust damper 4 to the position in which the furnace pressure will be at the desired value.

In order to operate the furnace at a pressure higher than atmospheric, temperature responsive device 8 is adjusted to maintain a balanced atmospheric pressure in the furnace. When so adjusted, air valve 16 is closed and valve 17 opened. Air at a pressure higher than atmospheric will now flow into housing 12 and thence to the furnace chamber. This flow of air reduces the ambient temperature to which thermal element 9 is subjected, and causes valve 7 to send a low or reduced pressure to bellows 41 so that regulator 5 will maintain the damper in or near its closed position. With the damper in this position, a pressure higher than atmospheric will be established and maintained in the furnace.

By regulating the amount of air flowing through valve 17 a relatively wide range of superatmospheric pressures may be established and maintained in the furnace.

To operate the furnace at pressures below atmospheric, valve 17 is closed and valve 16 opened. Air from valve 16 will then flow outwardly through pipe 14, and this flow produces an aspirating effect which reduces the pressure in housing 12 to a value below the pressure in the furnace. Hot gases will, therefore, flow through housing 12 and pipe 14, thereby changing the condition of temperature to which thermal element 9 is subjected. In this case, the temperature about element 9 is raised. By proper adjustment of valve 16, the temperature condition created in housing 12 may be made to correspond to the particular sub-atmospheric pressure desired in the furnace. Temperature responsive device 8 will, therefore, respond to changes in this condition of temperature and, through the agencies of valve 7, bellows 41 and regulator 5, cause the damper 4 to be adjusted to or near its open position. The damper being so controlled, a wide range of pre-selected sub-atmospheric pressures may be established and maintained in the furnace.

To practice the invention as herein disclosed, it will be apparent that a condition of temperature is created and that this condition is a function of the furnace pressure. A temperature responsive device is subjected to this condition of temperature and is affected by changes or variations therein. The temperature of the condition affected by the furnace pressure is measured, so to speak, and as the temperature varies from a constant value, the furnace draft is adjusted to restore the pressure to a predetermined constant value. The means illustrated for correcting the draft is a simple damper, however other means for correcting the draft may be employed.

As disclosed herein, the temperature responsive device illustrated for correcting the draft, in response to variations in furnace pressure as reflected in the thermal condition created in housing 12, utilizes the physical properties of expansion and contraction of suitable materials in conjunction with a valve and a pressure responsive element, to produce the desired draft regulation. While this type of temperature responsive element is disclosed, it will be apparent that other instruments, such as thermo-couples acting through electrical control devices or relays, may be utilized to regulate the furnace draft in accordance with the condition of temperature established in housing 12 or at any other point where the temperature condition is determined by the pressure in the furnace.

While various modifications and changes may be made in the invention as disclosed, without departing from its spirit or scope, it is to be understood that only such limitations shall be placed on the invention as are imposed by the prior art and the appended claims.

What I claim is:

1. The method of controlling the pressure in the combustion chamber of a furnace that consists in establishing a selected zone outside the furnace subjecting said zone to the flow of a cooling medium and opposing said flow of cooling medium with a flow of hot furnace gases that varies as the furnace pressure varies, measuring the temperature of said zone as affected by the flow of said cooling medium and hot furnace gases, and so controlling a variable affecting the furnace pressure in accordance with the temperature of said zone that the pressure in the furnace chamber is maintained substantially constant.

2. The method of regulating a condition incident to the operation of furnaces, which condition is dependent upon one or more variables entering into said furnace operation, that consists in establishing a zone or region of temperature, subjecting said zone to furnace pressure and opposing the furnace pressure, as applied to said zone with a pressure higher than atmospheric, whereby as the difference between said pressures varies the temperature of the zone varies, and then in regulating at least one of said variables in accordance with said variations in zone temperature.

3. The method of regulating furnace pressures that consists in establishing a zone of temperature outside of the furnace and heating said zone in accordance with the furnace pressure, subjecting said zone to a fluid pressure cooling medium acting in opposition to the furnace pressure, measuring the temperature of said zone, and regulating the furnace draft in accordance with temperature variations in said zone as affected by changes in one or the other of the pressures acting thereon.

4. The method of regulating furnace pressures that consists in creating a zone of temperature corresponding to a pressure of a predetermined value to be maintained substantially constant in the furnace, by subjecting said zone to furnace chamber pressure and a fluid pressure cooling medium, whereby as one or the other of said pressures varies the temperature of said zone is caused to vary by the flow of furnace gases or cooling medium thereto according to which pressure predominates, adjusting said pressures to attain the zone temperature corresponding to said predetermined furnace pressure, measuring the temperature of said zone, and then in regulating a variable affecting the furnace pressure in accordance with changes in the temperature of said zone.

5. The method of regulating furnace pressures that consists in creating a zone of temperature corresponding to a pressure of a predetermined value to be maintained substantially constant in the furnace, by subjecting said zone to furnace chamber pressure and a fluid pressure cooling medium, whereby as one or the other of said pressures varies the temperature of said zone is caused to vary by flow of furnace gases or cooling medium thereto according to which pressure predominates, adjusting said pressures to attain a zone temperature corresponding to said predetermined furnace pressure, measuring the temperature of said zone, and then in regulating the furnace draft in accordance with changes in the temperature of said zone.

6. The method of regulating furnace pressures that consists in creating a zone of temperature corresponding to a pressure of a predetermined value to be maintained substantially constant in the furnace, by subjecting said zone to furnace chamber pressure and a fluid pressure cooling medium, whereby as one or the other of said pressures varies the temperature of said condition is caused to vary by the flow of furnace gases or cooling medium therethrough depending on which pressure predominates, adjusting said pressures to attain a zone temperature corresponding to said predetermined furnace pressure, measuring the temperature of said zone and then in increasing the furnace draft in proportion to the change in temperature of said zone in one direction, and decreasing the furnace draft in proportion to a change in temperature in the opposite direction.

7. The method of establishing a condition of temperature that varies by and in accordance with the pressure in a furnace heating chamber or the like that consists in providing a confined space outside the furnace, subjecting said space to furnace chamber pressure and the flow of hot furnace gases, opposing the furnace pressure and gas flow into said space with a cooling fluid under a substantially constant pressure of a predetermined value, whereby as the furnace pressure varies the flow of hot gases varies, thereby varying the temperature of said space.

8. A system for regulating the chamber pressure of furnaces having means for changing the draft thereof, comprising a chamber having communication with the interior of furnace chamber and the pressure therein and with atmospheric pressure, a temperature responsive device arranged to respond to the temperature in said first mentioned chamber, the temperature of which varies as one or the other of said pressures predominates, and means under the control of said temperature responsive device for regulating said draft means in accordance with changes in temperature in said chamber.

9. A system for regulating the chamber pressure of furnaces having means for changing the draft thereof, comprising a chamber having communication with the interior of furnace chamber and the pressure therein, and with atmospheric pressure; a temperature responsive device arranged to respond to the temperature in said first mentioned chamber the temperature of which varies as one or the other of said pressures predominates, and means under the control of said temperature responsive device for regulating said draft means to decrease the furnace pressure when the temperature in said chamber rises above a predetermined value and to increase the furnace pressure when the chamber temperature falls below a predetermined value.

10. A pressure regulating system for furnaces having a damper for the adjustment of the furnace draft, comprising a housing having communication with the interior of the furnace so as to be subjected to the furnace temperature and pressure, said housing being vented to the atmosphere so that atmospheric pressure opposes the furnace pressure whereby as one or the other of said pressures predominates a flow of either hot gases from the furnace or of atmospheric air takes place in said housing in the direction in which the predominating pressure acts, thereby varying the temperature in the housing in accordance with the amount and direction of said flow, a temperature responsive element in said housing, a source of pressure supply, a regulator for operating said damper, a source of motive force for said regulator, a pressure responsive element for controlling the source of motive force to the regulator to thereby control its operation in adjusting the damper, and a valve under the control of said temperature responsive element for controlling the application of said pressure supply source to the pressure responsive element as the temperature in said housing varies.

11. A pressure regulating system for furnaces having means for regulating the furnace draft, comprising a housing having communication with the interior of the furnace and a tube through which it vents to the atmosphere, means in said tube for directing air under pressure higher than atmospheric into said housing whereby as said furnace pressure varies the temperature in said housing will vary, and means under the control of the temperature in said housing arranged to control said shaft regulating means to increase the draft when the temperature in said housing varies in one direction and to decrease the draft as the temperature varies in the opposite direction.

12. A pressure regulating system for furnaces having means for regulating the furnace draft, comprising a housing having communication with the interior of the furnace and a tube through which it vents to the atmosphere, means in said tube for directing air under pressure outwardly through said tube to thereby create an aspirating effect upon the interior of said housing to increase the flow of hot gases from the furnace therethrough, whereby the temperature in said housing increases, and means under the control of the temperature in said housing arranged to control said draft regulating means to increase the draft when the temperature in said housing varies in one direction and to decrease the draft as the temperature varies in the opposite direction.

13. A temperature responsive regulating device comprising a housing arranged to be connected to a furnace or the like with the interior of said housing in thermal and pressure communication with the heating chamber of the furnace, a thermal element in said housing, means communicating with the interior of said housing for introducing a cooling medium under pressure thereto in opposition to the furnace pressure, and means for adjusting the intensity of the pressure of said cooling medium at will.

14. A temperature responsive regulating device comprising a housing arranged to be associated with a furnace or the like with the interior of said housing in communication with the heating chamber of the furnace, a thermal element in said housing, a tube connected to the housing to provide a flow passageway between the interior of the housing and the atmosphere, and means in said tube arranged to be connected to a fluid pressure source to increase or decrease the flow of hot gases from the heating chamber through said housing.

15. A temperature responsive regulating device comprising a housing arranged to be associated with a furnace or the like with the interior of said housing in communication with the heating chamber of the furnace, a thermal element in said housing, a tube connected to the housing to provide a flow passageway between the interior of the housing and the atmosphere, a pressure pipe within said tube and extending therealong, two valves in said pipe, and a pressure line connected to said pipe between the valves, whereby if one of said valves is opened a pressure higher than atmospheric may be established in the housing in opposition to the furnace pressure, and if the other of said valves is opened, a pressure lower than atmospheric may be established in said housing to thereby give predominance to the furnace pressure over atmospheric pressure in the housing.

16. A temperature responsive regulating device comprising a housing arranged to be associated with a furnace or the like with the interior of said housing in communication with the heating chamber of the furnace, a thermal element in said housing, a tube connected to the housing to provide a flow passageway between the interior of the housing and the atmosphere, and means in said tube arranged to be connected to a source of cooling fluid under pressure to increase or decrease the flow of hot gases from the heating chamber through said housing.

17. In combination with a furnace having a port in a wall thereof providing communication between the furnace chamber and a cooler region having a gaseous medium of substantially constant temperature such that furnace gases may flow to the cooler region when the furnace pressure exceeds the pressure of the gaseous media in the cooler region, and media from the cooler region may flow to the furnace when the furnace chamber pressure is less than the pressure of said media, thereby producing a temperature change in said port that varies with the flow of media or of furnace gases therethrough, and means responsive to temperature changes in said port adapted to maintain a predetermined relation between the furnace chamber pressure and the pressure of the media in said cooler region.

GEORGE W. SMITH.

CERTIFICATE OF CORRECTION.

Patent No. 1,931,906.                                                                October 24, 1933.

GEORGE W. SMITH.

It is hereby certified that error appears in the printed specification of the above numbered patent requiring correction as follows: Page 6, lines 113-114, claim 6, for "condition" read zone; page 7, line 132, claim 17, for "medium" read media; and that the said Letters Patent should be read with these corrections therein that the same may conform to the record of the case in the Patent Office.

Signed and sealed this 12th day of December, A. D. 1933.

F. M. Hopkins (Seal)                              Acting Commissioner of Patents.